United States Patent
Yusa et al.

(10) Patent No.: US 9,565,407 B2
(45) Date of Patent: Feb. 7, 2017

(54) PROJECTION DISPLAY APPARATUS AND IMAGE DISPLAY SYSTEM

(71) Applicant: CANON KABUSHIKI KAISHA, Tokyo (JP)

(72) Inventors: Koichi Yusa, Utsunomiya (JP); Toshiyuki Noda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 14/744,399

(22) Filed: Jun. 19, 2015

(65) Prior Publication Data
US 2015/0381952 A1   Dec. 31, 2015

(30) Foreign Application Priority Data
Jun. 27, 2014  (JP) .................................. 2014-132653

(51) Int. Cl.
*H04N 9/31* (2006.01)
*G02B 27/00* (2006.01)

(52) U.S. Cl.
CPC ........ *H04N 9/3144* (2013.01); *G02B 27/0006* (2013.01); *H04N 9/3102* (2013.01); *H04N 9/315* (2013.01); *H04N 9/3141* (2013.01)

(58) Field of Classification Search
CPC ... G03B 21/208; G03B 21/2053; H04N 9/315; H04N 9/3105; H04N 9/3197; G02B 5/3016; G02F 1/1334
See application file for complete search history.

(56) References Cited

U.S. PATENT DOCUMENTS

| | | | | |
|---|---|---|---|---|
| 6,955,436 B2 * | 10/2005 | Watanabe | .............. | G02B 26/06 348/E9.027 |
| 2006/0268243 A1 * | 11/2006 | Woo | ..................... | G03B 21/208 353/97 |

FOREIGN PATENT DOCUMENTS

| JP | 11-305674 A | 11/1999 |
|---|---|---|
| JP | 2004-020603 A | 1/2004 |

\* cited by examiner

*Primary Examiner* — Sultan Chowdhury
(74) *Attorney, Agent, or Firm* — Fitzpatrick, Cella, Harper & Scinto

(57) ABSTRACT

A projection display apparatus includes a light shielding member provided with an opening through which light from a light source passes, and a light modulation element unit configured to face the light shielding member to be illuminated by the light passing through the opening of the light shielding member, the light shielding member has a first region and a second region that is located between the first region and the opening, the light modulation element unit has a third region facing the first region, and a fourth region facing the second region, and a first average temperature gradient between the first region and the third region is greater than a second average temperature gradient between the second region and the fourth region.

17 Claims, 13 Drawing Sheets

PROJECTION DISPLAY APPARATUS AND IMAGE DISPLAY SYSTEM

BACKGROUND OF THE INVENTION

Field of the Invention

The present invention relates to a projection display apparatus which reduces adherence of fine foreign substances to a light modulation element.

Description of the Related Art

A projection display apparatus is provided with a plurality of heating elements in its inside. In order to cool these heating elements, for example, using a fan disposed inside the projection display apparatus, the air outside the projection display apparatus is taken in its inside and the air is introduced to the heating elements to be cooled. In this case, a lot of foreign substances such as dusts may float according to the environment of setting up the projection display apparatus. Therefore, a quality of a projection image may be deteriorated by the foreign substances intruded and adhering to an optical element provided inside the projection display apparatus when the cooling air is taken in its inside. Particularly, when the foreign substances adhere to an light modulation element, there is a problem that the foreign substances are easily visible in the projection image. On the other hand, the light modulation element needs to perform a position adjustment with respect to optical components housed inside the projection display apparatus and its performance is affected by stress due to an external force, and therefore it is difficult to adopt a solid sealed structure Previously, a configuration in which a dust collection filter is disposed at an intake (air inlet), or a flexible dust-proof member such as a formed material having a small reaction force and a rubber is disposed around the optical element has been known. Japanese Patent Laid-open No. H11-305674 discloses a configuration in which a first dust-proof member is disposed between a light shielding plate and a base to which the light modulation element is attached and a second dust-proof member is disposed between a wave plate and the light shielding plate to ensure a high dust-proof property. Japanese Patent Laid-open No. 2004-020603 discloses a configuration in which a dust-proof cover is disposed between a light shielding member and a polarization beam splitter.

However, even in the configurations disclosed in Japanese Patent Laid-open Nos. H11-305674 and 2004-020603, there is a possibility that fine foreign substances are intruded through a gap in the dust-proof component. Particularly, it is difficult to ensure a sufficient dust-proof property (sealing property) for fine particles not greater than 1 μm for example, and dirt gradually adheres to the optical components due to the use for a long time and color unevenness may be displayed in the projection image.

When a filter which is provided with a small opening is used to capture the fine particles, a ventilation resistance of the filter increases and accordingly a noise of the fan increases and a size of an apparatus is enlarged. When the adherence or contact pressure is increased to improve the sealing property of each component, a dismantling property is deteriorated and the stress to the optical component is increased, and accordingly the optical performance is deteriorated and the position of the optical component is displaced.

SUMMARY OF THE INVENTION

The present invention provides a projection display apparatus and an image display system capable of reducing adherence of foreign substances to a light modulation element.

A projection display apparatus as one aspect of the present invention includes a light shielding member provided with an opening through which light from a light source passes, and a light modulation element unit configured to face the light shielding member to be illuminated by the light passing through the opening of the light shielding member, the light shielding member has a first region and a second region that is located between the first region and the opening, the light modulation element unit has a third region facing the first region, and a fourth region facing the second region, and a first average temperature gradient between the first region and the third region is greater than a second average temperature gradient between the second region and the fourth region.

A projection display apparatus as another aspect of the present invention includes a light shielding member provided with an opening through which light from a light source passes, and a light modulation element unit configured to face the light shielding member to be illuminated by the light passing through the opening of the light shielding member, the light shielding member has a first region and a second region that is located between the first region and the opening, the light modulation element unit has a third region facing the first region, and a fourth region facing the second region, and a distance between the light shielding member in the second region and the light modulation element unit in the fourth region is smaller than a distance between the light shielding member in the first region and the light modulation element unit in the third region.

An image display system as another aspect of the present invention includes the projection display apparatus and an image supplying apparatus configured to supply image information to the projection display apparatus.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 25:
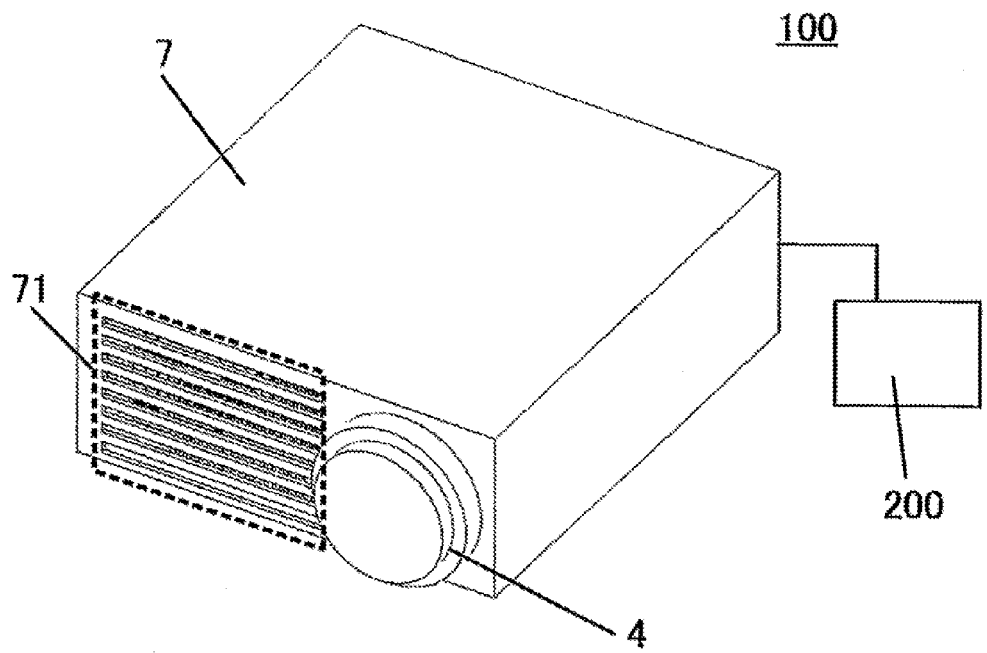
FIG. 25 is a schematic external view of a projection display apparatus in each embodiment.
Figure 26:
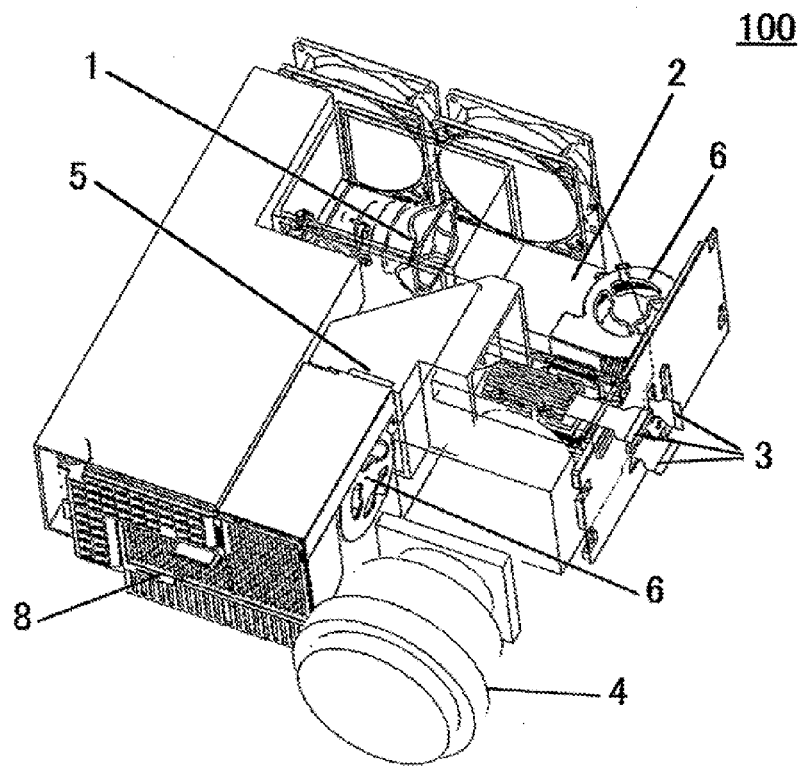
FIG. 26 is an internal configuration diagram of the projection display apparatus in each embodiment.

First of all, referring to FIGS. 25 and 26, an entire configuration of a projection display apparatus in this embodiment will be described. FIG. 25 is a schematic external view of the projection display apparatus 100 in each embodiment. FIG. 26 is an internal configuration diagram of the projection display apparatus 100.

Reference numeral 1 denotes a light source. Reference numeral 2 denotes an optical block that houses optical components to guide light emitted from the light source 1 to a light modulation element block 3. Reference numeral 4 denotes a projection lens that magnifies and projects the light emitted from the light source 1 onto an external screen. Reference numeral 5 denotes a cooling duct that guides air for cooling the optical components including a light modulation element to the optical components. Reference numeral 6 denotes s cooling fan (sirocco fan) that cools the light modulation element. Reference numeral 7 denotes an exterior case that houses each component provided in the projection display apparatus 100. The exterior case 7 is provided with an air inlet 71 as an intake of cooling air on a front surface of the projection display apparatus 100. A dust collection filter 8 is attached to the air inlet 71.

Driving the cooling fan 6, external air that comes in from the air inlet 71 through the dust collection filter 8 passes through the cooling duct 5 and is blown toward the light modulation element block 3. In this time, the duct collection filter 8 prevents many of dusts that float in the air from intruding into the air inlet 71 and thus they are captured. Fine particles, however, may pass through the dust collection filter 8 and be blown to the light modulation element by the cooling air.

In this embodiment, an image display system including the projection display apparatus 100 and an image supplying apparatus 200 that supplies image information to the projection display apparatus 100 can also be provided.

Embodiment 1

Figure 1:
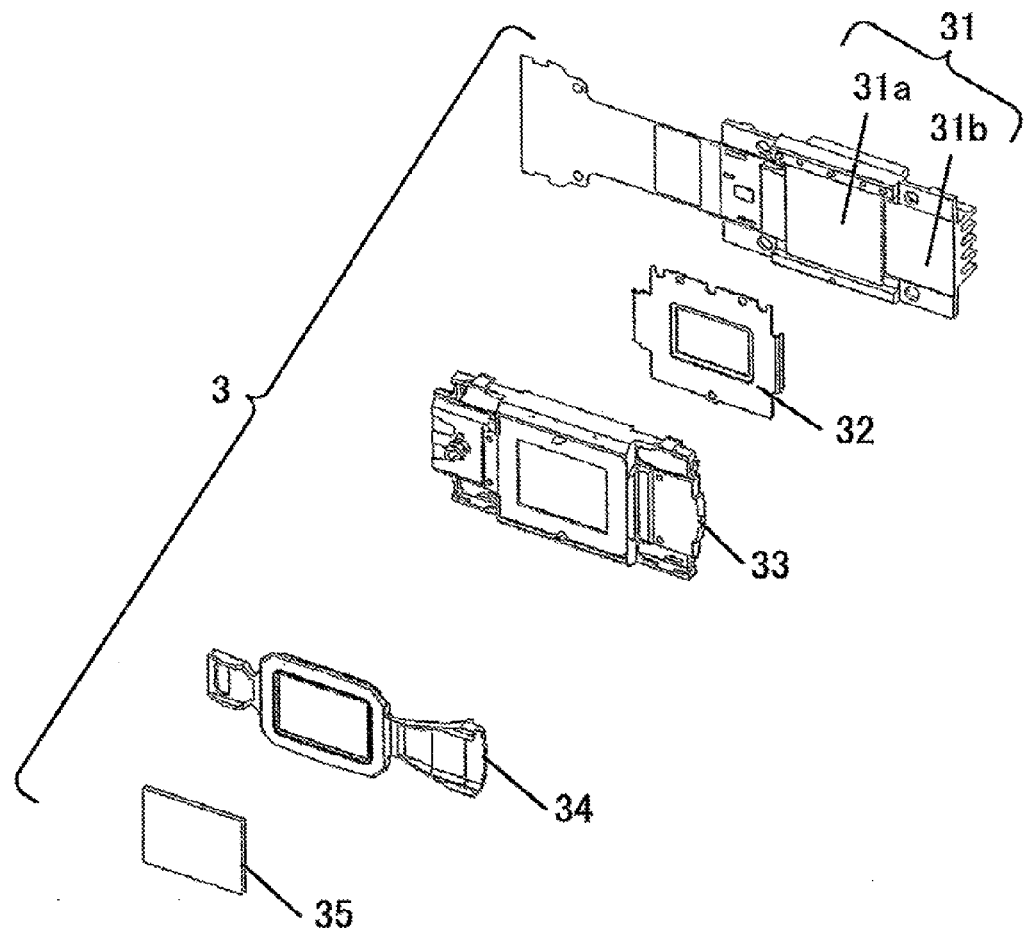
FIG. 1 is an exploded perspective view of a light modulation element block in Embodiment 1.
Figure 2:
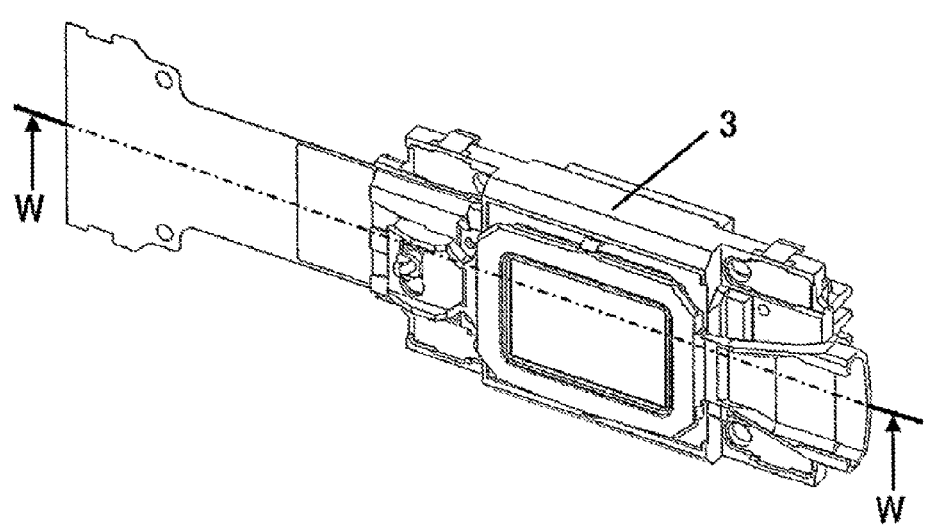
FIG. 2 is a configuration diagram of the light modulation element block in Embodiment 1.
Figure 3:
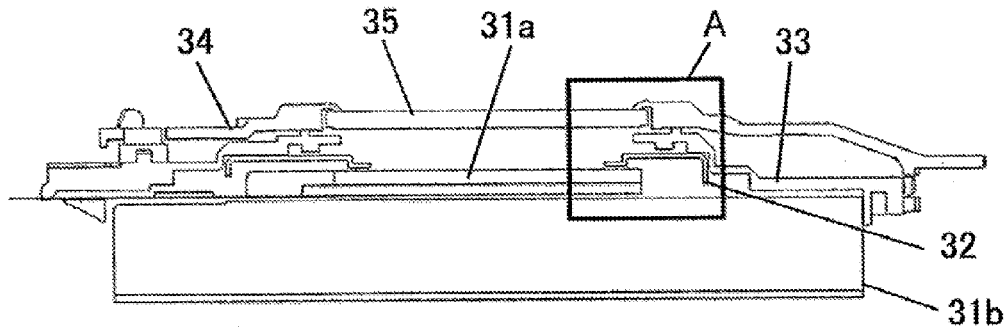
FIG. 3 is a cross-sectional view of the light modulation element block in Embodiment 1.
Figure 4A:
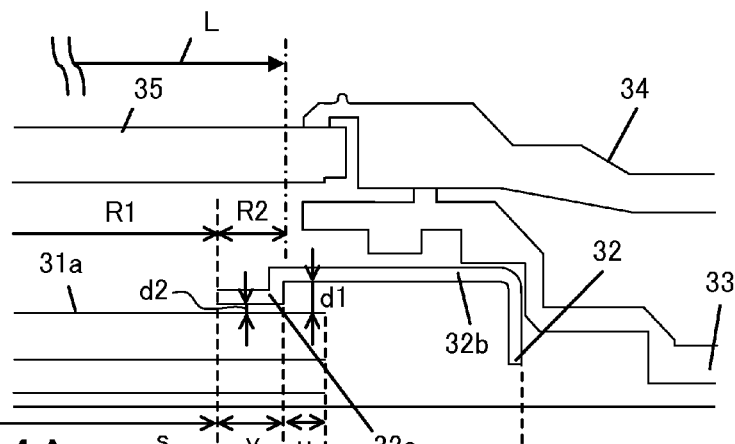
FIGS. 4A and 4B are an enlarged view of a range A in FIG. 3 and a diagram of illustrating a relation between a position and a temperature, respectively.

Next, referring to FIGS. 1 to FIGS. 4A and 4B, a light modulation element block in Embodiment 1 of the present invention will be described. FIG. 1 is an exploded perspective view of a light modulation element block 3. FIG. 2 is a configuration diagram of the light modulation element block 3 in a state where each of components are assembled. FIG. 3 is a cross-sectional view along a line W-W in FIG. 2. FIG. 4A is an enlarged view of a range A in FIG. 3, and FIG. 4B is a diagram of illustrating a relation between a position and a temperature in the range A.

Reference numeral 31 denotes a light modulation element unit. The light modulation element unit 31 includes a light modulation element 31a provided with a cover glass adhering to a light entrance plane of the light modulation element 31a, and a radiator 31b (heat sink). Reference numeral 32 denotes a light shielding mask (light shielding member). The light shielding mask 32 is provided with an opening larger than a pixel region (effective pixel region) of the light modulation element 31a. A position of the opening of the light shielding mask 32 is fixed adjustably in accordance with the effective pixel region of the light modulation element 31a. Reference numeral 33 denotes a dust-proof cover (dust-proof member). The dust-proof cover 33 contacts the radiator 31b, and it prevents foreign substances from adhering to a surface of the cover glass of the light modulation element 31a. Reference numeral 34 denotes a wave plate holding member. The wave plate holding member 34 holds a wave plate 35 described below, and it is provided with an opening which is larger than that of the light shielding mask 32. The wave plate holding member 34 can rotationally adjust the wave plate 35 with respect to the light modulation element 31a. Reference numeral 35 denotes the wave plate.

The dust-proof cover 33 is attached to the radiator 31b to clasp the radiator 31b, and it holds the radiator 31b tightly. Accordingly, a gap formed between the radiator 31b and the dust-proof cover 33 can be reduced. The dust-proof cover 33 contacts the wave plate holding member 34 with pressure, and thus a gap between the members is reduced. Even when the wave plate holding member 34 is rotationally adjusted, following an abutting surface of the member, the generation of the gap is prevented or reduced. In this configuration, even when a certain air pressure is applied due to the blast by the cooling fan 6, the intrusion of the foreign substances can be reduced. The light shielding mask 32 has a shape (L-shaped convex portion) which is convex toward the light modulation element 31a around the opening located approximately at the center when it is assembled. Accordingly, compared to other portions, a periphery of the opening of the light shielding mask 32 is close to the cover glass of the light modulation element 31a.

Figure 4B:
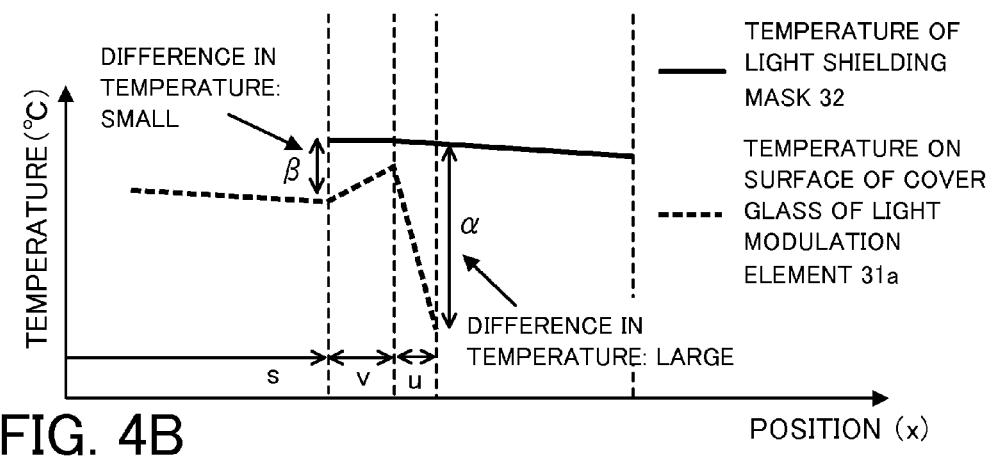

FIG. 4B is a graph of illustrating a relation between a position corresponding to the cross-sectional enlarged view of the projection display apparatus 100 illustrated in FIG. 4A and a temperature on the light shielding mask 32 and the surface of the cover glass of the light modulation element 31a. A horizontal axis indicates the position (x), and a vertical axis indicates the temperature (degrees C.). In FIG. 4B, a solid line indicates the temperature on the light shielding mask 32 and a dashed line indicates the temperature on the surface of the cover glass of the light modulation element 31a. FIG. 4B illustrates each temperature in a state where the temperature detected by a temperature detector (not illustrated) provided inside the light modulation element 31a is controlled to be a predetermined temperature after a certain period of time from turning on the light source 1 by the activation of the projection display apparatus 100.

In FIG. 4A, reference symbol L denotes an entrance range of light (light beam) emitted from the light source 1 and illuminated on the light modulation element 31a. The light passes through the opening of the wave plate holding member 34, and then it illuminates on the opening (region R1) and the periphery (region R2) of the opening of the light shielding mask 32. In this case, much light from the light source 1 passes through the opening of the light shielding mask 32 to reach the light modulation element 31a. However, part of the light is absorbed by the light shielding mask 32 (on the periphery of the opening). Therefore, the temperature on the surface of the cover glass of the light modulation element 31a on which the light is illuminated and the temperature of the light shielding mask 32 which absorbs the light increase. Typically, the light shielding mask 32 is constituted by metal. Accordingly, compared to a resin or a glass, the light shielding mask 32 (light shielding mask constituted by metal) has a high heat conductivity and thermal diffusion occurs up to a region where the light is not illuminated, and as a result an illuminated region and an unilluminated region of the light have approximately the same temperature. On the other hand, the cover glass of the light modulation element 31a has a low heat conductivity. Therefore, the temperature on the region illuminated by the light from the light source 1 increases, and on the other hand the temperature on the portion (region) shielded by the light shielding mask 32 remains to be low. Since the cover glass of the light modulation element 31a has a high transmittance, the temperature on the cover glass of the light modulation element 31a is lower than that on the light shielding mask 32. In this embodiment, a material constituting the light shielding mask is metal, specifically it is preferred that the light shielding mask has the heat conductivity not less than 150 (W/m·K), more preferably not less than 236 (W/m·K).

In this embodiment, the periphery of the opening of the light shielding mask 32 has a convex portion 32a (protrusion, or second region) which is close, compared to other portions, to the cover glass of the light modulation element 31a. Preferably, the convex portion 32a of the light shielding mask 32 is continuously formed for example by drawing a sheet metal. As a result, a distance between the light shielding mask 32 and the cover glass of the light modulation element 31a is reduced (d1>d2). Therefore, an amount of movement of heat from the light shielding mask 32 to the cover glass of the light modulation element 31a increases, and thus the temperature of the cover glass (fourth region) corresponding to a position of the convex portion 32a of the light shielding mask 32 rises (region v in FIG. 4B). In other words, a difference (difference in temperature) between the temperature of the periphery of the opening (convex portion 32a) of the light shielding mask 32 and the temperature of the cover glass of the light modulation element 31a which is close to it is decreased. On the other hand, with respect to a portion 32b (first region) located away from the periphery of the opening (convex portion 32a) of the light shielding mask 32, the distance between the light shielding mask 32 and the cover glass (third region) of the light modulation element 31a is large. Therefore, a heat-transfer amount from the light shielding mask 32 to the cover glass of the light modulation element 31a is smaller than that of the convex portion 32a located at the periphery of the opening. Accordingly, the difference in temperature between the portion 32b of the light shielding mask 32 and the cover glass of the light modulation element 31a increases (region u in FIG. 4B).

As described above, when a stable temperature gradient is kept between two certain surfaces, a stable concentration gradient is formed in a direction opposite to that of the temperature gradient. In this embodiment, a value obtained by dividing a difference in temperature between two certain surfaces (between two regions) by a gap between the two surfaces (between the two regions) is defined as an average temperature gradient. In other words, when fine particles are carried by cooling air, the concentration of the fine particles increases at a low temperature side. In the configuration of this embodiment, in the region v (second region and fourth region), a temperature difference β between the temperature on the periphery of the opening (convex portion 32a) of the light shielding mask 32 and the temperature on a surface of the cover glass of the light modulation element 31a facing (i.e. opposed to) the convex portion 32a is small, and as a result a second average temperature gradient decreases. Therefore, the adherence of the fine particles carried from an outside to the cover glass of the light modulation element 31a can be reduced. On the other hand, in the region u (first region and third region), a temperature difference α between the temperature of the portion 32b of the light shielding mask 32 and the temperature on the surface of the cover glass of the light modulation element 31a facing (i.e. opposed to) the portion 32b is large, and as a result a first average temperature gradient increases. Accordingly, the fine particles carried from the outside can positively adhere to the cover glass of the light modulation element 31a.

In this embodiment, since the convex portion 32a is formed on the periphery of the opening of the light shielding mask 32, the adherence of the fine particles can be facilitated in the region u which is located outside the convex portion 32a, i.e. which is located farther away from the opening than the convex portion 32a is. Thus, the light shielding mask 32 is capable of achieving a role as so-called a filter, which reduces an amount of the fine particles reaching the effective pixel region (region s in FIG. 4B) of the light modulation element 31a. Reducing the adherence of the fine particles in the region v (region facing the convex portion 32a) located near the effective pixel region of the light modulation element 31a, appearance of the fine particles to a projection image can be reduced. In other words, a projection display apparatus which is capable of keeping a high image quality over along period of time can be provided even in an environment where a lot of floating fine particles exist in the air.

It is preferred that the light shielding mask 32 is constituted by a heat conductive member such as aluminum alloy and copper alloy having a high heat conductivity. This is because the temperature of the light shielding member in the region u can be increased to generate much difference in temperature and thus the efficiency of capturing the fine particles can be improved.

As described above, in the projection display apparatus 100 of this embodiment, the light shielding member (light shielding mask 32) is provided with the opening through which light from the light source 1 passes. The light modulation element unit 31 is provided to face the light shielding member and it is configured to be illuminated by the light passing through the opening of the light shielding member. The light shielding member has a first region (region u) and a second region (region v) that is located between the first region and the opening. The first average temperature gradient (temperature difference α/d1) between the light shielding member in the first region and the light modulation element unit in the third region facing the first region is greater than the second average temperature gradient (temperature difference β/d2) between the light shielding member in the second region and the light modulation element unit in the fourth region facing the second region.

Preferably, the second region is located around the opening (i.e. near the opening) of the light shielding member. The first region is located farther away from the opening than the second region is. Preferably, the light modulation element unit 31 includes the light modulation element 31a including the cover glass and configured to be illuminated by the light from the light source 1, and the radiator 31b configured to release heat of the light modulation element 31a. More preferably, the second region is located around an effective pixel region (region s) of the light modulation element 31a. The first region is located farther away from the effective pixel region than the second region is. The first average temperature gradient is an average temperature gradient between the light shielding member in the first region and the cover glass of the light modulation element in the third region. The second average temperature gradient is an average temperature gradient between the light shielding member in the second region and the cover glass of the light modulation element in the fourth region. Preferably, the projection display apparatus 100 includes the dust-proof member (dust-proof cover 33) attached to the radiator 31b to cover the cover glass of the light modulation element 31a.

Preferably, the first and second average temperature gradients are average temperature gradients determined when a predetermined period of time passes after the light source 1 is turned on. Preferably, a distance between the light shielding member in the second region and the light modulation element unit in the fourth region is smaller than a distance between the light shielding member in the first region and the light modulation element unit in the third region (d1>d2). More preferably, the light shielding member in the second region has a shape (convex portion 32a) protruded in a direction toward the light modulation element unit 31.

Embodiment 2

Figure 5:
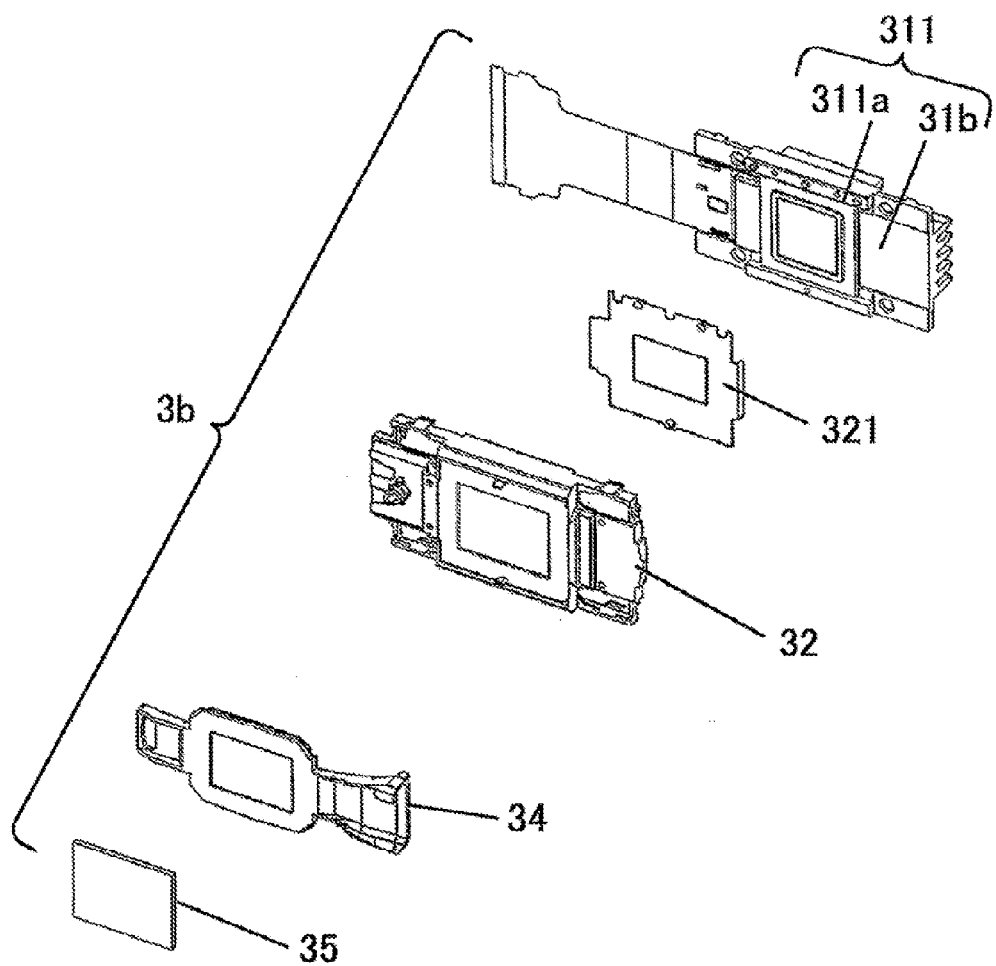
FIG. 5 is an exploded perspective view of a light modulation element block in Embodiment 2.
Figure 6:
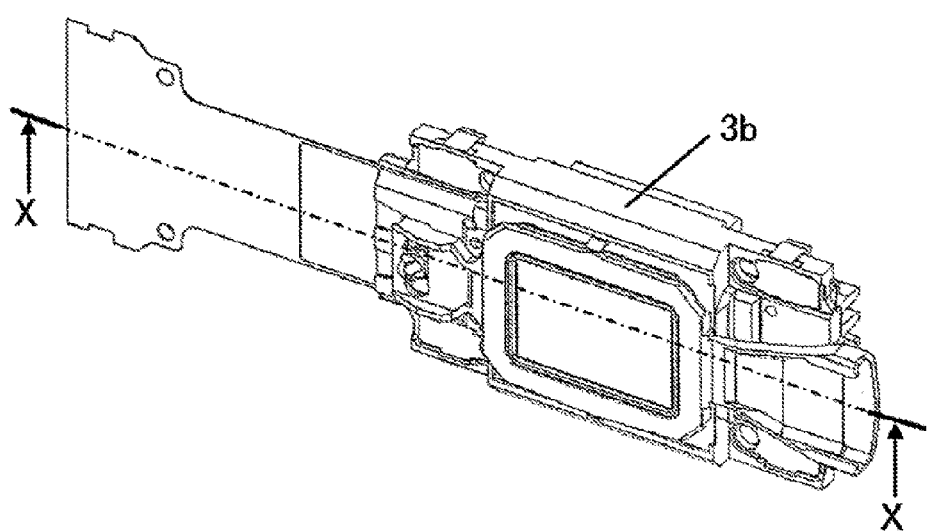
FIG. 6 is a configuration diagram of the light modulation element block in Embodiment 2.
Figure 7:
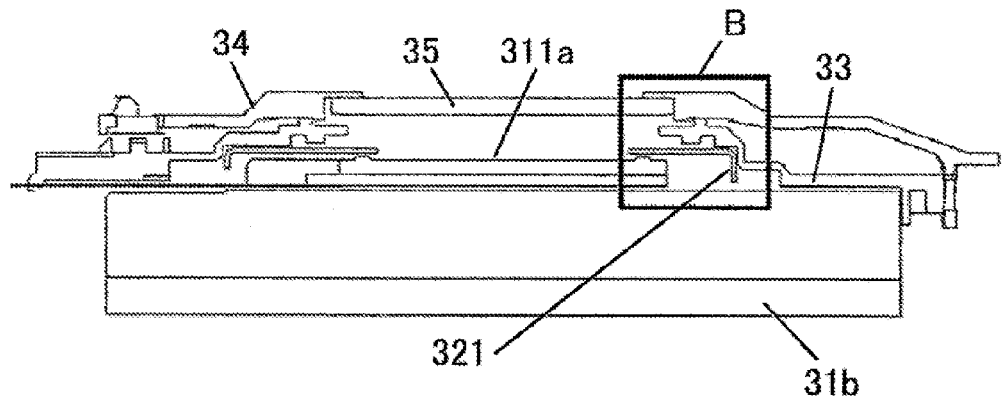
FIG. 7 is a cross-sectional view of the light modulation element block in Embodiment 2.
Figure 8A:
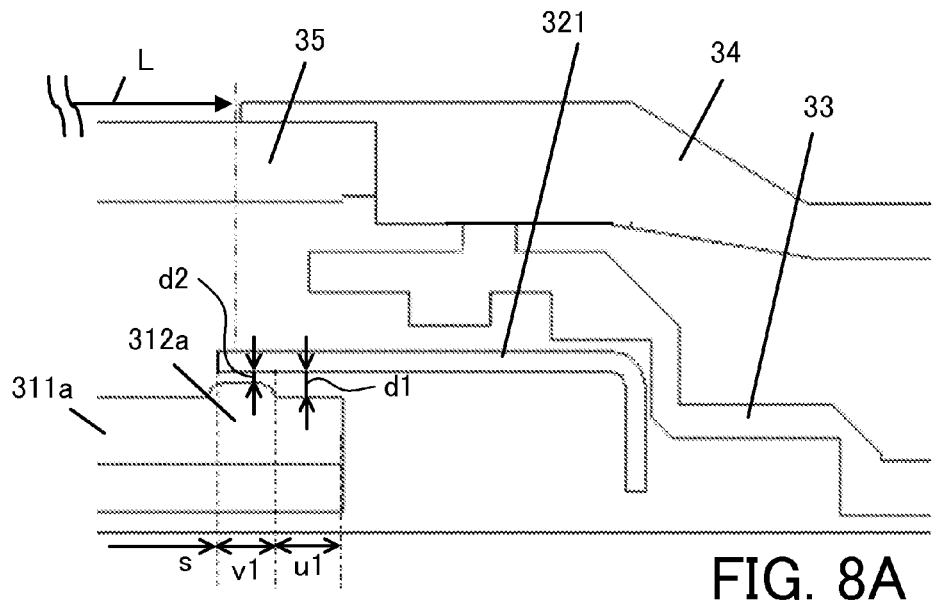
FIGS. 8A and 8B are an enlarged view of a range B in FIG. 7 and a diagram of illustrating a relation between a position and a temperature, respectively.

Next, referring to FIGS. 5 to FIGS. 8A and 8B, a light modulation element block in Embodiment 2 of the present invention will be described. FIG. 5 is an exploded perspective view of a light modulation element block 3b. FIG. 6 is a configuration diagram of the light modulation element block 3b in a state where each of components are assembled. FIG. 7 is a cross-sectional view along a line X-X in FIG. 6. FIG. 8A is an enlarged view of a range B in FIG. 7, and FIG. 8B is a diagram of illustrating a relation between a position and a temperature in the range B.

The light modulation element block 3b of this embodiment is different from the light modulation element block 3 of Embodiment 1 in that the light modulation element block 3b includes a light modulation element unit 311 and alight shielding mask 321, instead of the light modulation element unit 31 and the light shielding mask 32. Other portions of the light modulation element block 3b are the same as those of the light modulation element block 3 of Embodiment 1, and therefore descriptions thereof are omitted.

The light modulation element unit 311 includes a light modulation element 311a and the radiator 31b. A cover glass of the light modulation element 311a has a convex shape (convex portion 312a) protruded toward the light shielding mask 321 at a position (fourth region) facing a periphery of the opening of the light shielding mask 321 (region v1 in FIGS. 8A and 8B). Accordingly, compared to other portions (third region) of the light modulation element 311a, the convex portion 312a of the light modulation element 311a is close to the light shielding mask 321.

Figure 8B:
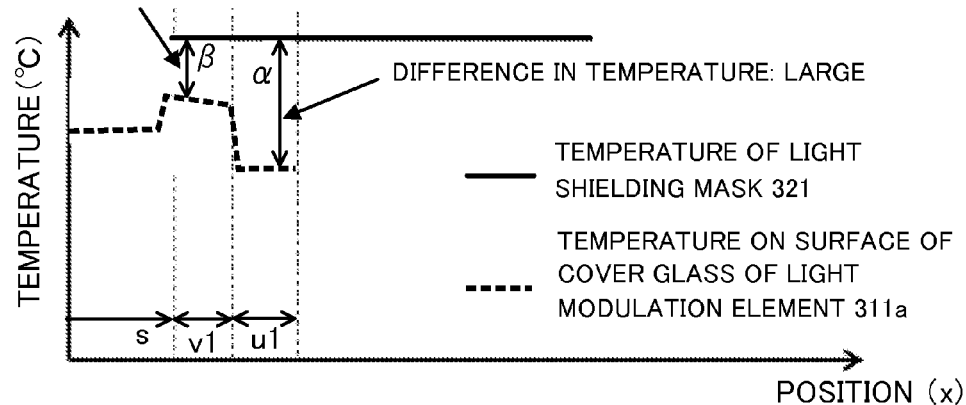

As a result, as illustrated in FIG. 8B, the effect similar to that of Embodiment 1 can be achieved. In this embodiment, the convex portion 312a is formed on the periphery of the opening (region v1, i.e. second region and fourth region) of the light shielding mask 321. Accordingly, the adherence of the fine particles can be facilitated in the region u1 (first region and third region) which is located farther away from the opening than the convex portion 312a is. Thus, the light shielding mask 321 is capable of achieving a role as so-called a filter, which reduces an amount of the fine particles reaching the effective pixel region of the light modulation element 311a. Reducing the adherence of the fine particles in the region v1 (region facing the convex portion 312a) located near the effective pixel region of the light modulation element 311a, appearance of the fine particles to a projection image can be reduced. In other words, a projection display apparatus which is capable of keeping a high image quality over a long period of time can be provided even in an environment where a lot of floating fine particles exist in the air. Similarly to Embodiment 1, it is preferred that the light shielding mask 321 is constituted by a heat conductive member such as aluminum alloy and copper alloy having a high heat conductivity.

Embodiment 3

Figure 9:
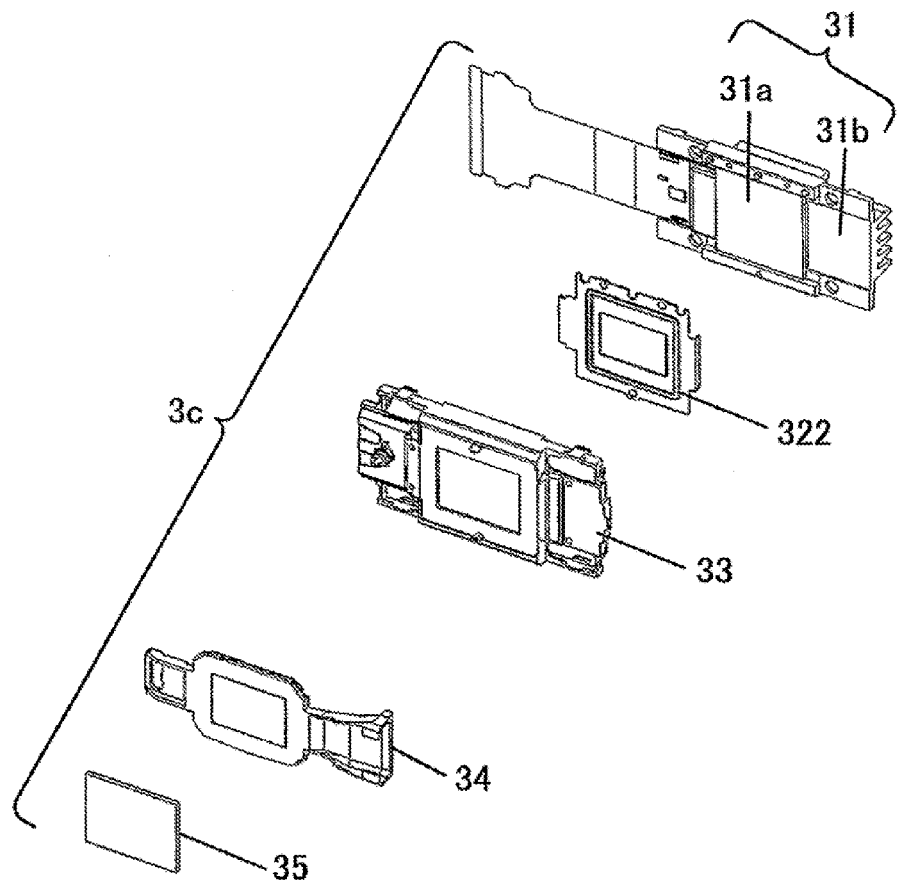
FIG. 9 is an exploded perspective view of a light modulation element block in Embodiment 3.
Figure 10:
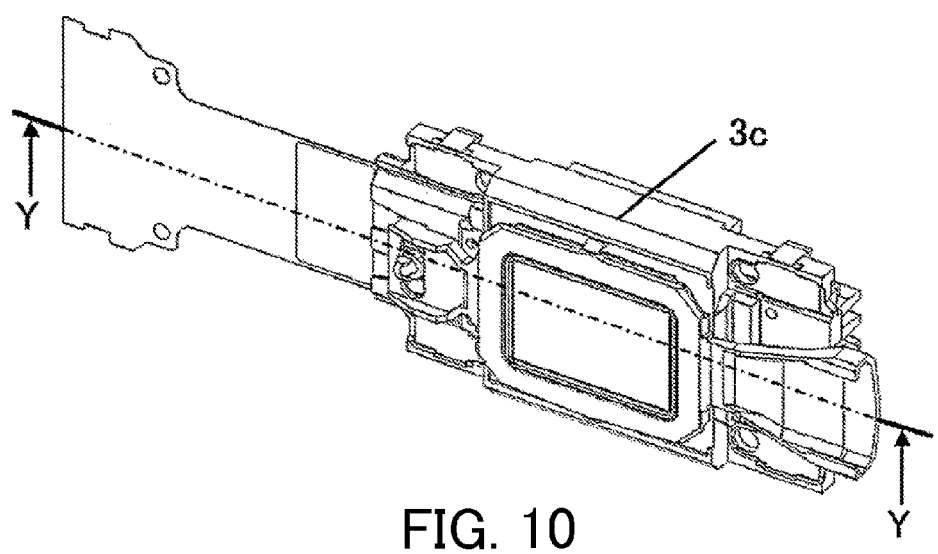
FIG. 10 is a configuration diagram of the light modulation element block in Embodiment 3.
Figure 11:
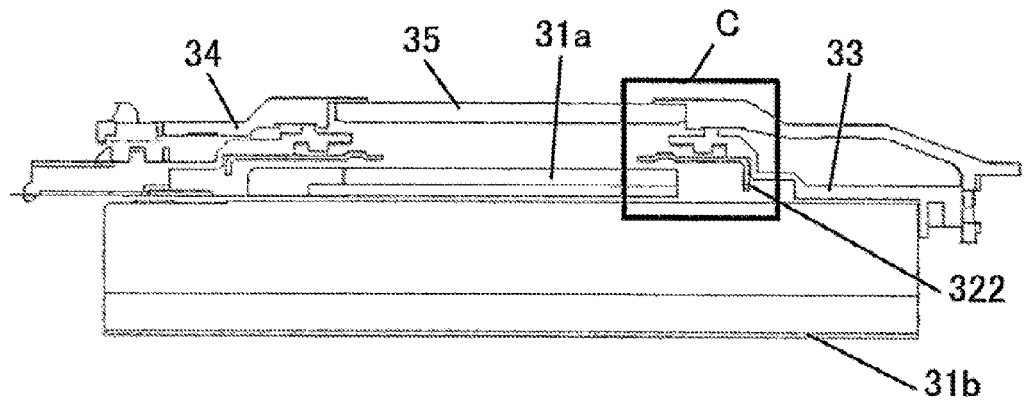
FIG. 11 is a cross-sectional view of the light modulation element block in Embodiment 3.
Figure 12A:
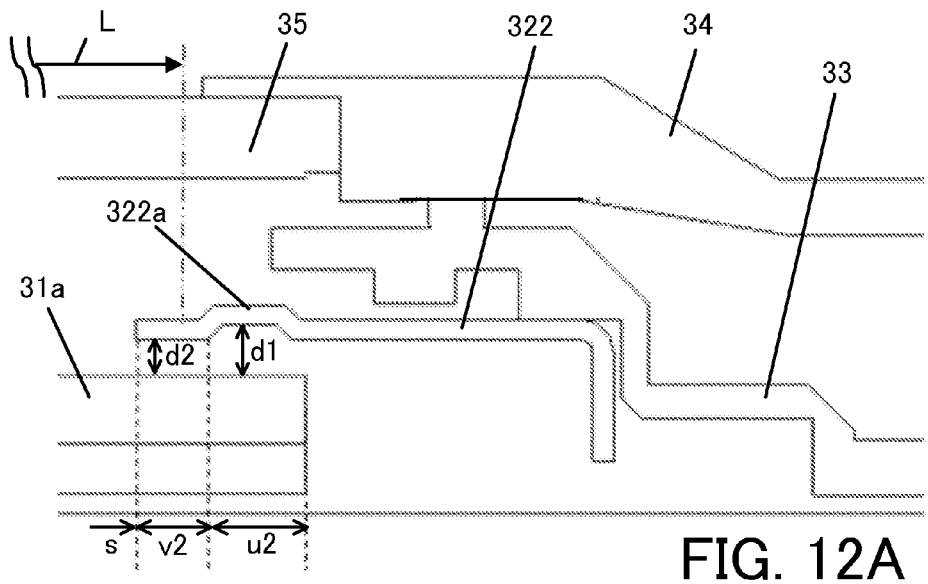
FIGS. 12A and 12B are an enlarged view of a range C in FIG. 11 and a diagram of illustrating a relation between a position and a temperature, respectively.

Next, referring to FIGS. 9 to FIGS. 12A and 12B, a light modulation element block in Embodiment 3 of the present invention will be described. FIG. 9 is an exploded perspective view of a light modulation element block 3c. FIG. 10 is a configuration diagram of the light modulation element block 3c in a state where each of components are assembled. FIG. 11 is a cross-sectional view along a line Y-Y in FIG. 10. FIG. 12A is an enlarged view of a range C in FIG. 11, and FIG. 12B is a diagram of illustrating a relation between a position and a temperature in the range C.

The light modulation element block 3c of this embodiment is different from the light modulation element block 3 of Embodiment 1 in that the light modulation element block 3c includes alight shielding mask 322 instead of the light shielding mask 32. Other portions of the light modulation element block 3c are the same as those of the light modulation element block 3 of Embodiment 1, and therefore descriptions thereof are omitted.

The light shielding mask 322 in the region around the opening (region u2, i.e. first region) has a concave portion 322a (in other words, a convex portion protruded in a direction opposite to the light modulation element 31a) at a position facing the cover glass of the light modulation element 31a. Thus, the concave portion 322a of the light shielding mask 322 is away from the cover glass of the light modulation element 31a, compared to other portions (second region) of the light shielding mask 322.

Figure 12B:
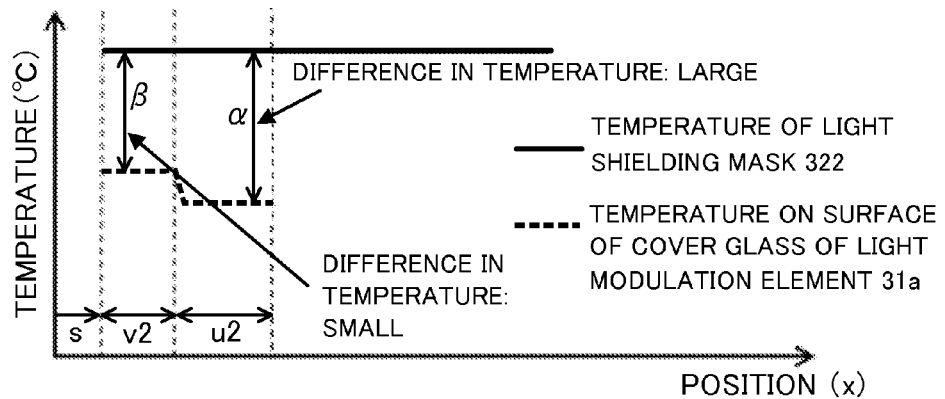

As a result, as illustrated in FIG. 12B, the effect similar to that of Embodiment 1 can be achieved. In this embodiment, the concave portion 322a is formed on the periphery of the opening (region u2) of the light shielding mask 322. Accordingly, the adherence of the fine particles can be facilitated in the region u2 (first region and third region) which is located farther away from the opening than the region v2 (second region and fourth region) near the effective pixel region of the light modulation element 31a is. Thus, the light shielding mask 322 is capable of achieving a role as so-called a filter, which reduces an amount of the fine particles reaching the effective pixel region of the light modulation element 31a. Reducing the adherence of the fine particles in the region v2 located near the effective pixel region of the light modulation element 31a, appearance of the fine particles to a projection image can be reduced. In other words, a projection display apparatus which is capable of keeping a high image quality over a long period of time can be provided even in an environment where a lot of floating fine particles exist in the air. Similarly to Embodiment 1, it is preferred that the light shielding mask 322 is constituted by a heat conductive member such as aluminum alloy and copper alloy having a high heat conductivity.

Embodiment 4

Figure 13:
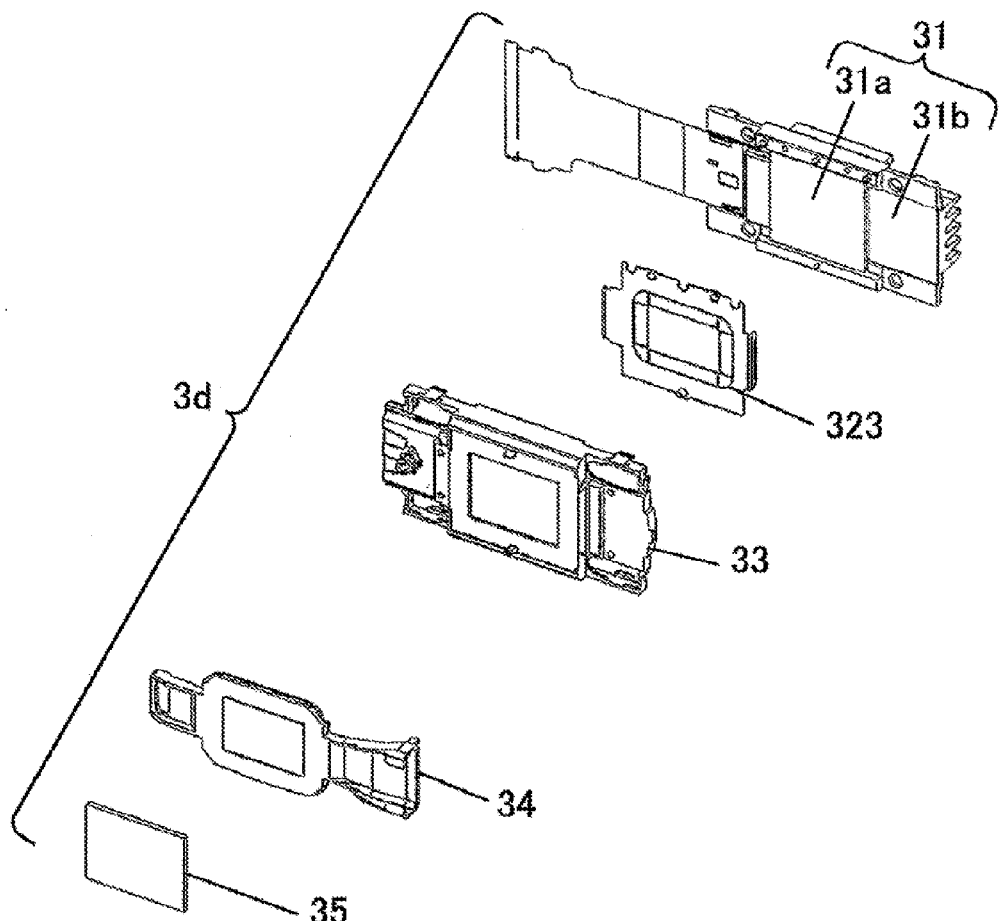
FIG. 13 is an exploded perspective view of a light modulation element block in Embodiment 4.
Figure 14:
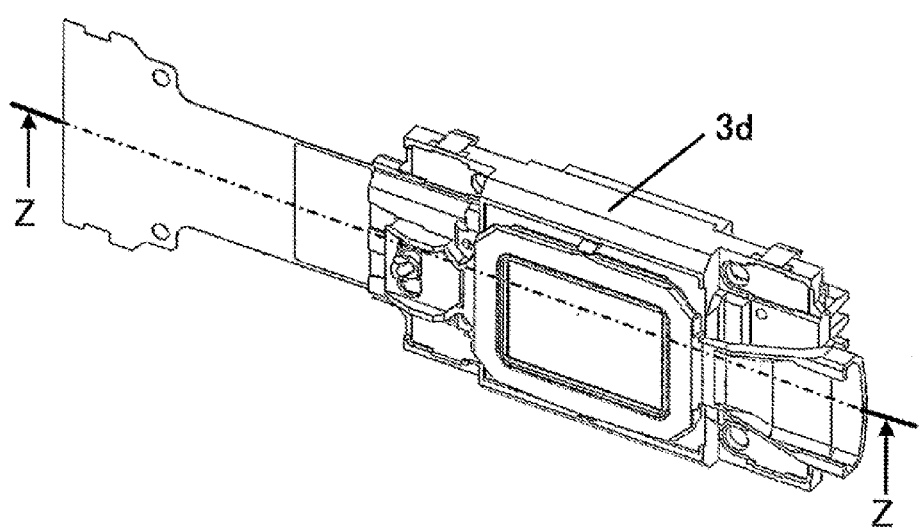
FIG. 14 is a configuration diagram of the light modulation element block in Embodiment 4.
Figure 15:
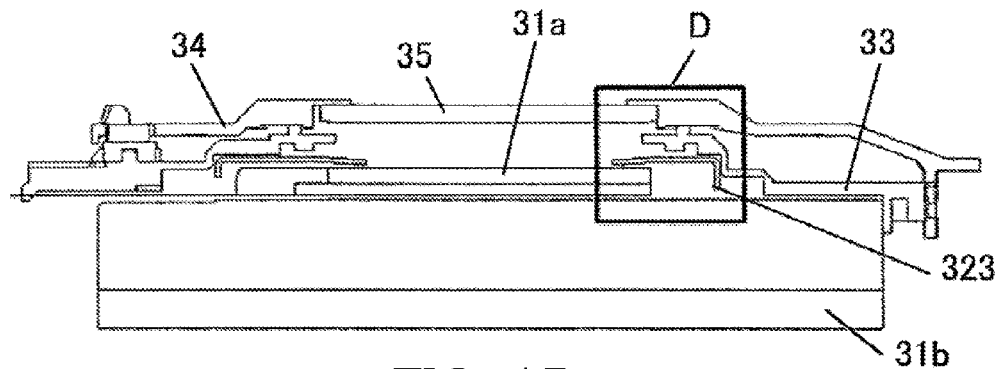
FIG. 15 is a cross-sectional view of the light modulation element block in Embodiment 4.
Figure 16A:
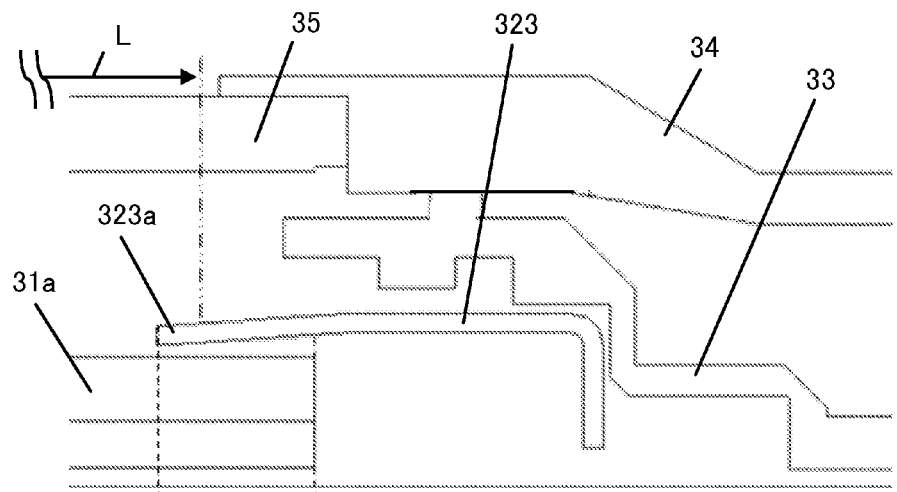
FIGS. 16A and 16B are an enlarged view of a range D in FIG. 15 and a diagram of illustrating a relation between a position and a temperature, respectively.

Next, referring to FIGS. 13 to FIGS. 16A and 16B, a light modulation element block in Embodiment 4 of the present invention will be described. FIG. 13 is an exploded perspective view of a light modulation element block 3d. FIG. 14 is a configuration diagram of the light modulation element block 3d in a state where each of components are assembled. FIG. 15 is a cross-sectional view along a line Z-Z in FIG. 14. FIG. 16A is an enlarged view of a range D in FIG. 15, and FIG. 16B is a diagram of illustrating a relation between a position and a temperature in the range D.

The light modulation element block 3d of this embodiment is different from the light modulation element block 3 of Embodiment 1 in that the light modulation element block 3d includes alight shielding mask 323 instead of the light shielding mask 32. Other portions of the light modulation element block 3d are the same as those of the light modulation element block 3 of Embodiment 1, and therefore descriptions thereof are omitted.

The light shielding mask 323 in the region (region v3) around the opening has an inclined shape portion 323a (inclined portion) where a gap between the cover glass of the light modulation element 31a and the light shielding mask 323 increases with distance from the opening (effective pixel region, i.e. region s) of the light shielding mask 323. As described above, the inclined shape portion 323a of the light shielding mask 323 comes close to the cover glass of the light modulation element 31a with decreasing the distance from the opening of the light shielding mask 323 (i.e. with decreasing the distance from the effective pixel region (region s) in a region v3). In other words, the inclined shape portion 323a is formed to be close to the light modulation element 31a in the region v3.

Figure 16B:
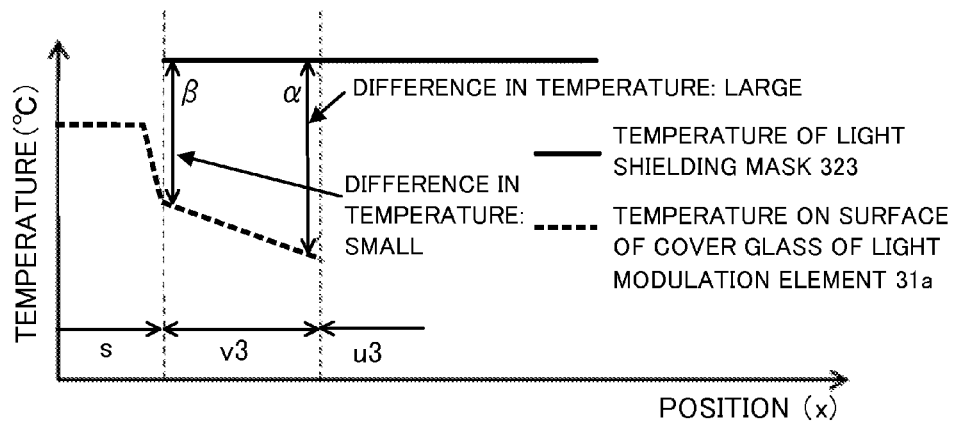

As a result, as illustrated in FIG. 16B, the effect similar to that of Embodiment 1 can be achieved. In this embodiment, the inclined shape portion 323a is formed on the periphery of the opening (region v3) of the light shielding mask 323. Accordingly, the adherence of the fine particles can be facilitated in the region u3 which is located farther away from the opening than the region v3 near the effective pixel region of the light modulation element 31a is. Thus, the light shielding mask 323 is capable of achieving a role as so-called a filter, which reduces an amount of the fine particles reaching the effective pixel region of the light modulation element 31a. Reducing the adherence of the fine particles in the region v3 located near the effective pixel region of the light modulation element 31a, appearance of the fine particles to a projection image can be reduced. In other words, a projection display apparatus which is capable of keeping a high image quality over a long period of time can be provided even in an environment where a lot of floating fine particles exist in the air. It is preferred that the light shielding mask 323 is constituted by a heat conductive member such as aluminum alloy and copper alloy having a high heat conductivity.

Embodiment 5

Figure 17:
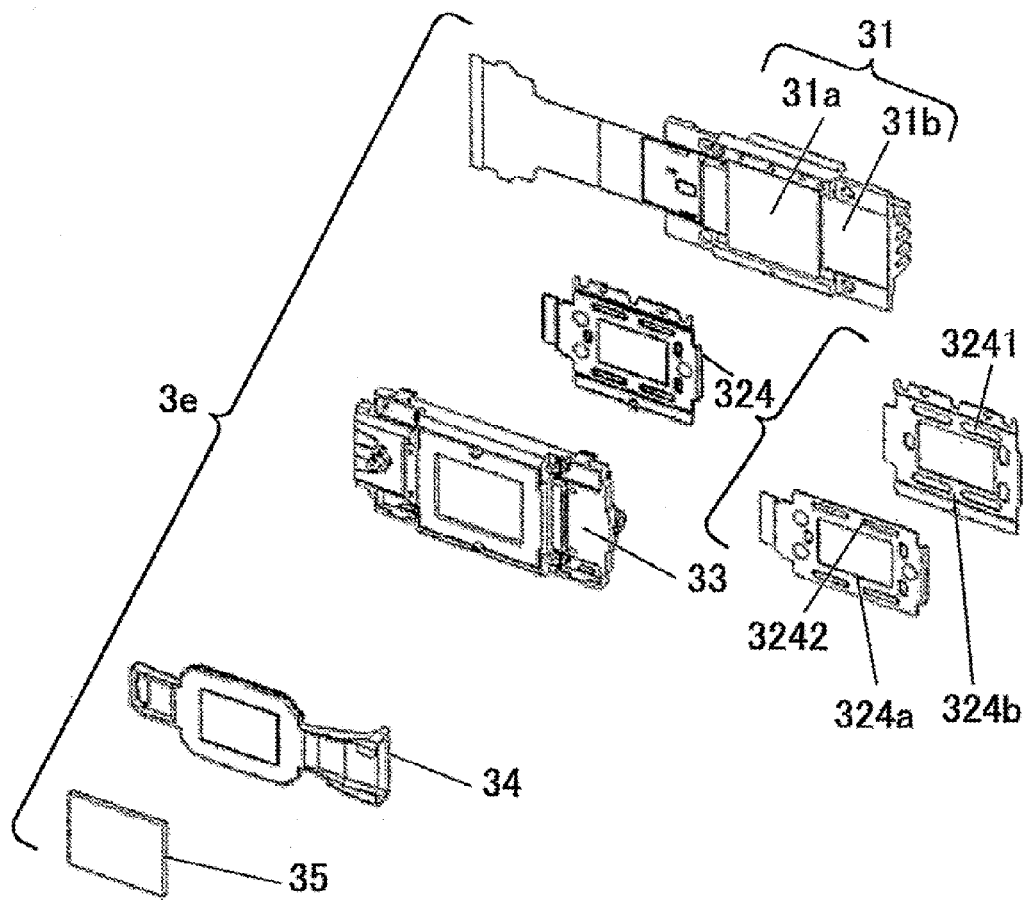
FIG. 17 is an exploded perspective view of a light modulation element block in Embodiment 5.
Figure 18:
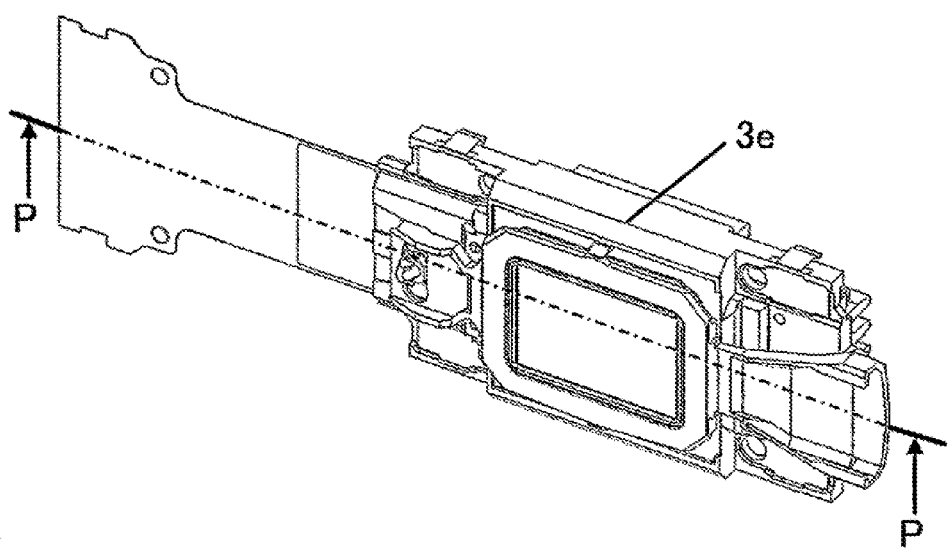
FIG. 18 is a configuration diagram of the light modulation element block in Embodiment 5.
Figure 19:
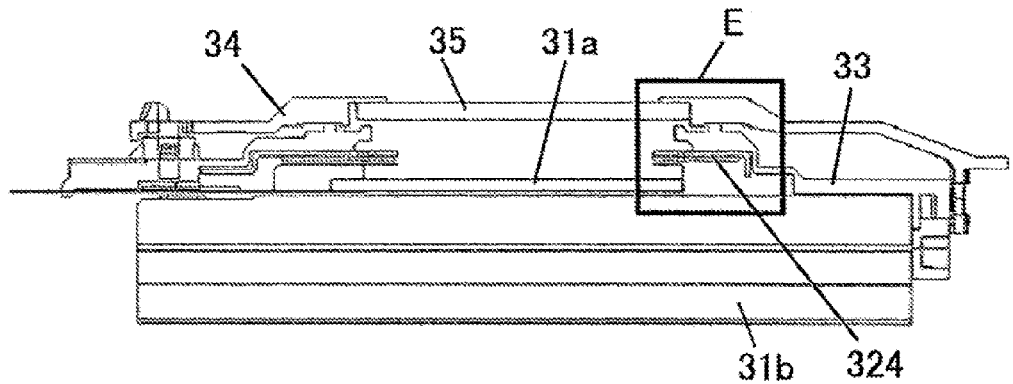
FIG. 19 is a cross-sectional view of the light modulation element block in Embodiment 5.
Figure 20A:
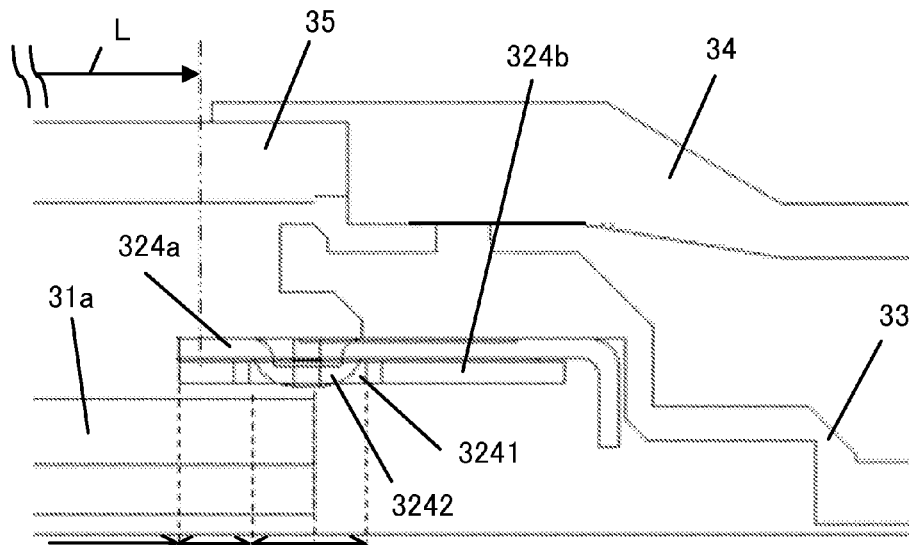
FIGS. 20A and 20B are an enlarged view of a range E in FIG. 19 and a diagram of illustrating a relation between a position and a temperature, respectively.
Figure 20B:
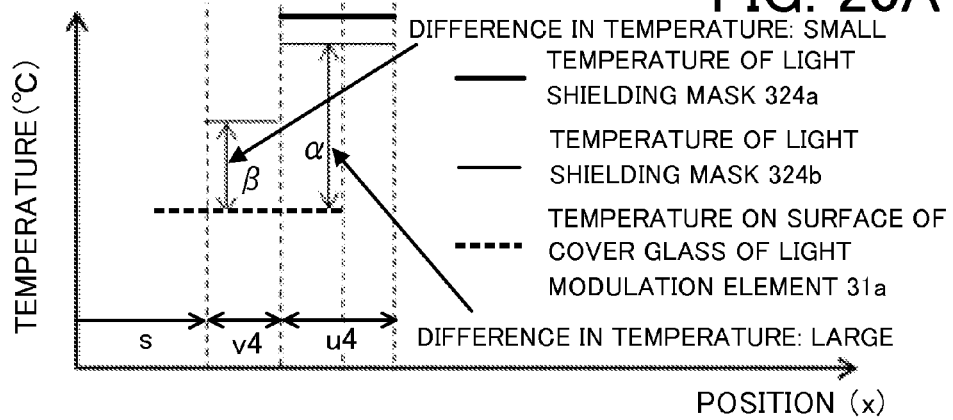

Next, referring to FIGS. 17 to FIGS. 20A and 20B, a light modulation element block in Embodiment 5 of the present invention will be described. FIG. 17 is an exploded perspective view of a light modulation element block 3e. FIG. 18 is a configuration diagram of the light modulation element block 3e in a state where each of components are assembled. FIG. 19 is a cross-sectional view along a line P-P in FIG. 18. FIG. 20A is an enlarged view of a range E in FIG. 19, and FIG. 20B is a diagram of illustrating a relation between a position and a temperature in the range E.

The light modulation element block 3e of this embodiment is different from the light modulation element block 3 of Embodiment 1 in that the light modulation element block 3e includes a light shielding mask 324 instead of the light shielding mask 32. Other portions of the light modulation element block 3e are the same as those of the light modulation element block 3 of Embodiment 1, and therefore descriptions thereof are omitted.

The light shielding mask 324 includes light shielding mask portions 324a and 324b (first light shielding mask and second light shielding mask) constituted by two materials having heat conductivities different from each other. The light shielding mask portion 324a (first light shielding mask) is provided closer to the light source 1, and it is constituted by a material having a relatively-low heat conductivity. The light shielding mask portion 324b (second light shielding mask) is provided closer to the light modulation element 31a, and it is constituted by a material having a relatively-high heat conductivity.

In this embodiment, the light shielding mask portions 324a and 324b are not thermally coupled to each other. The light shielding mask portion 324b having the high heat conductivity, which is provided closer to the light modulation element 31a, is thermally coupled to the radiator 31b. The light shielding mask portion 324b is provided with a plurality of openings 3241 in a region (region u4) away from the opening through which a light beam illuminated from the light source 1 passes. The light shielding mask portion 324a provided closer to the light source 1 has a convex portion 3242 protruded toward the openings 3241 to fill the openings 3241 formed on the light shielding mask portion 324b.

As a result, as illustrated in FIG. 20B, the effect similar to that of Embodiment 1 can be achieved. According to this embodiment, adopting the light shielding mask 324, the adherence of the fine particles can be facilitated in the region u4 (first region and third region) which is located farther away from the opening than the region v4 (second region and fourth region) near the effective pixel region of the light modulation element 31a is. Thus, the light shielding mask 324 is capable of achieving a role as so-called a filter, which reduces an amount of the fine particles reaching the effective pixel region of the light modulation element 31a. Reducing the adherence of the fine particles in the region v4 located near the effective pixel region of the light modulation element 31a, appearance of the fine particles to a projection image can be reduced. In other words, a projection display apparatus which is capable of keeping a high image quality over a long period of time can be provided even in an environment where a lot of floating fine particles exist in the air.

Preferably, in this embodiment, the portion (light shielding mask portion 324a) to be illuminated by the light beam emitted from the light source 1 is constituted by a first heat conductive member such as stainless steel. The portion (light shielding mask portion 324b) which contacts the radiator 31b of the light modulation element unit 31 is constituted by a second heat conductive member such as aluminum alloy and copper alloy. The first heat conductive member (low heat conductive member) has a heat conductivity lower than that of the second heat conductive member (high heat conductive member).

Accordingly, the temperature of the light shielding mask portion 324a provided closer to the light source 1 rises, and thus the difference in temperature between the light shielding mask portion 324a and the surface of the cover glass of the light modulation element 31a increases, and as a result the average temperature gradient can be increased. Furthermore, the rise in temperature of the light shielding mask portion 324b provided closer to the light modulation element 31a is suppressed, the difference in temperature between the light shielding mask portion 324b and the surface of the cover glass of the light modulation element 31a decreases, and as a result the average temperature gradient can be reduced. In this embodiment, it is not necessary to form the convex portion 3242 on the light shielding mask portion 324a provided closer to the light source 1, and an effect of this embodiment can be achieved without forming the convex portion 3242. Preferably, the light shielding mask portions 324a and 324b are coupled with a plurality of spot contacts. The light shielding mask portions 324a and 324b can be constituted by two kinds of metal shaped members manufactured by a 3D printer or the like to achieve the same effect.

As described above, in this embodiment, the light shielding member (light shielding mask 324) includes a first light shielding member (light shielding mask portion 324a), and a second light shielding member (light shielding mask portion 324b) which is disposed closer to the light modulation element unit than the first light shielding member is. The second light shielding member contacts the radiator 31b, and the second light shielding member in the first region (region u4) is provided with a plurality of openings (openings 3241). More preferably, the first light shielding member has the plurality of protrusions (convex portions 3242) inserted into the plurality of openings.

Embodiment 6

Figure 21:
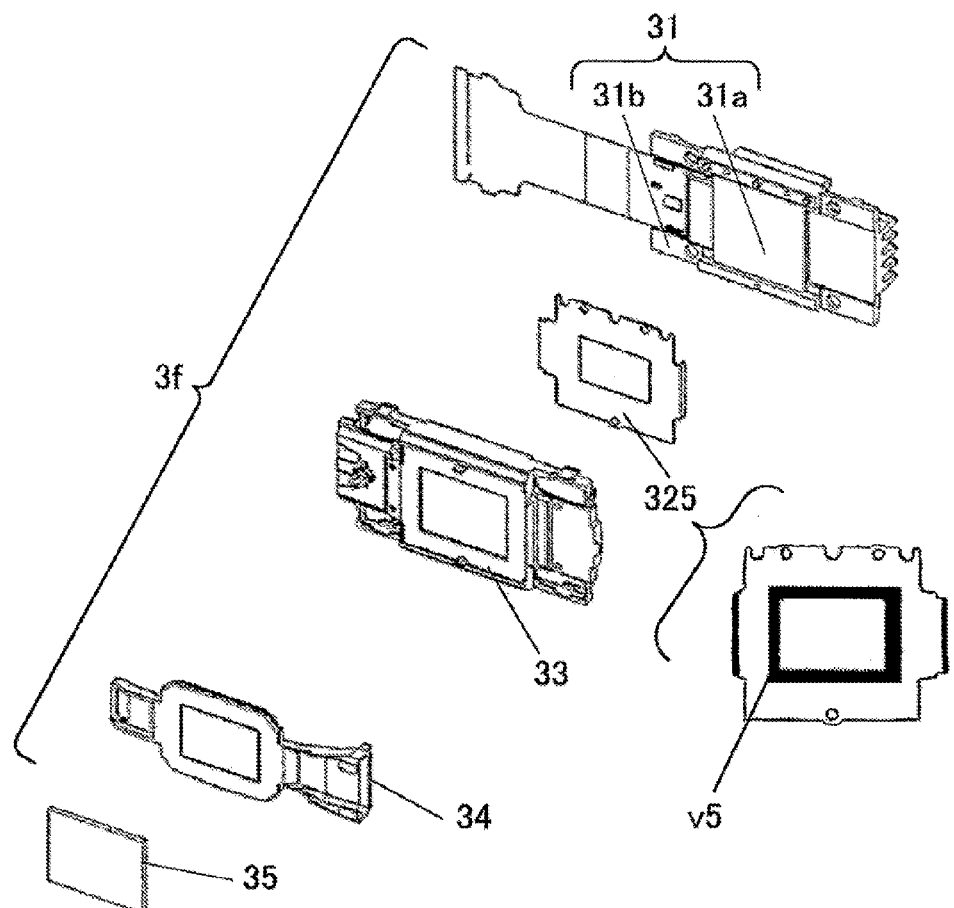
FIG. 21 is an exploded perspective view of a light modulation element block in Embodiment 6.
Figure 22:
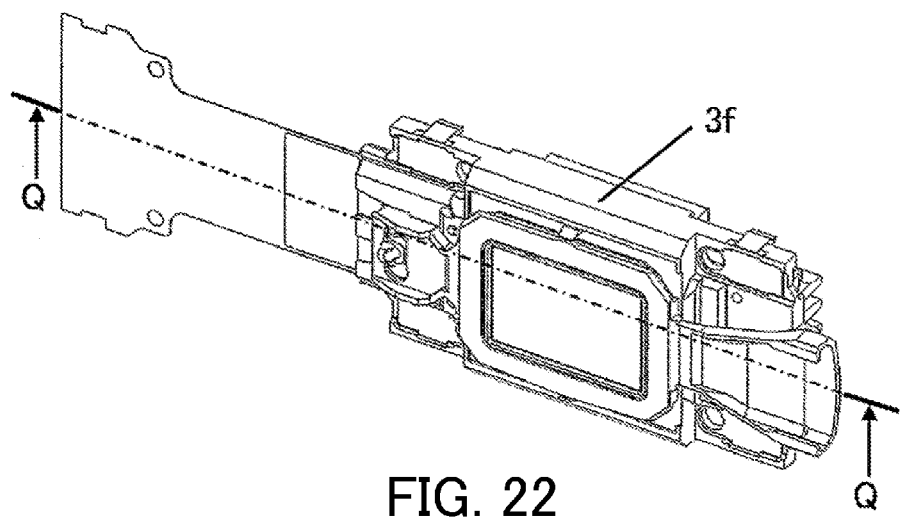
FIG. 22 is a configuration diagram of the light modulation element block in Embodiment 6.
Figure 23:
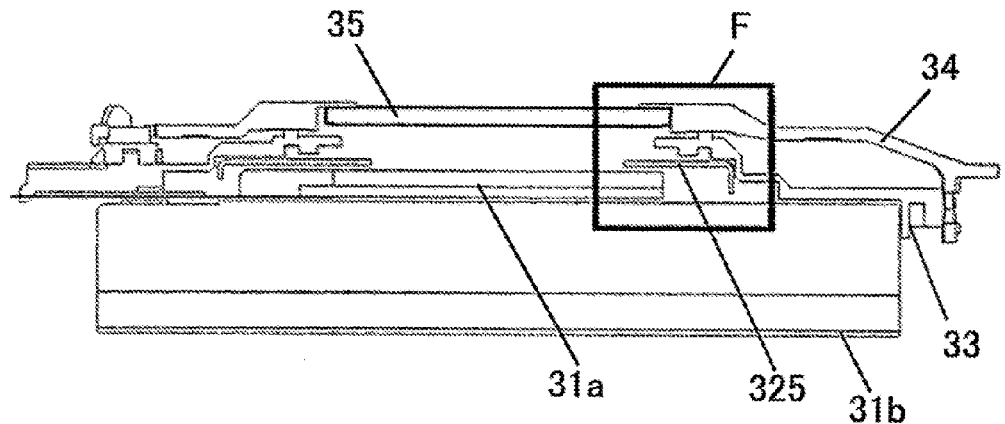
FIG. 23 is a cross-sectional view of the light modulation element block in Embodiment 6.
Figure 24A:
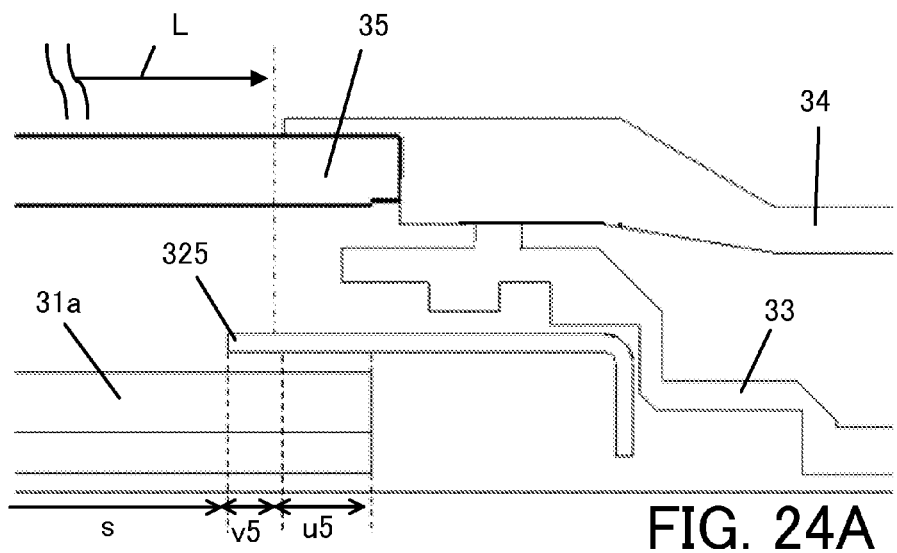
FIGS. 24A and 24B are an enlarged view of a range F in FIG. 23 and a diagram of illustrating a relation between a position and a temperature, respectively.

Next, referring to FIGS. 21 to FIGS. 24A and 24B, a light modulation element block in Embodiment 6 of the present invention will be described. FIG. 21 is an exploded perspective view of a light modulation element block 3f. FIG. 22 is a configuration diagram of the light modulation element block 3f in a state where each of components are assembled. FIG. 23 is a cross-sectional view along a line Q-Q in FIG. 22. FIG. 24A is an enlarged view of a range F in FIG. 23, and FIG. 24B is a diagram of illustrating a relation between a position and a temperature in the range F.

The light modulation element block 3f of this embodiment is different from the light modulation element block 3 of Embodiment 1 in that the light modulation element block 3f includes alight shielding mask 325 instead of the light shielding mask 32. Other portions of the light modulation element block 3f are the same as those of the light modulation element block 3 of Embodiment 1, and therefore descriptions thereof are omitted.

As illustrated in FIG. 21, the light shielding mask 325 in the region (region v5) around the opening has a surface facing the cover glass of the light modulation element 31a and a black surface treatment is performed on the surface. Accordingly, radiant heat from the processed surface by the black surface treatment (region v5) of the light shielding mask 325 easily transfers to the cover glass of the light modulation element 31a. On the other hand, radiant heat from an unprocessed surface of the light shielding mask 325 to the cover glass of the light modulation element 31a does not easily occur.

Figure 24B:
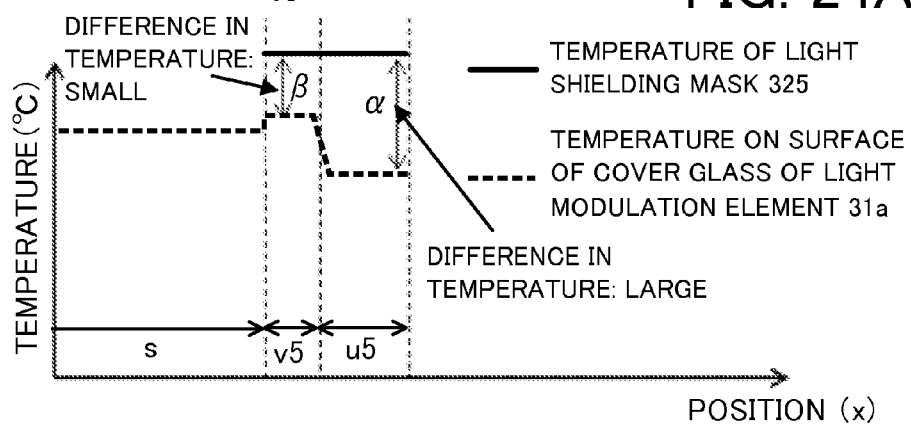

As a result, as illustrated in FIG. 24B, the effect similar to that of Embodiment 1 can be achieved. According to this embodiment, adopting the light shielding mask 325, the adherence of the fine particles can be facilitated in the region u5 (first region and third region) which is located farther away from the opening than the region v5 (second region and fourth region) near the effective pixel region of the light modulation element 31a is. Thus, the light shielding mask 325 is capable of achieving a role as so-called a filter, which reduces an amount of the fine particles reaching the effective pixel region of the light modulation element 31a. Reducing the adherence of the fine particles in the region v5 located near the effective pixel region of the light modulation element 31a, appearance of the fine particles to a projection image can be reduced. In other words, a projection display apparatus which is capable of keeping a high image quality over a long period of time can be provided even in an environment where a lot of floating fine particles exist in the air.

In this embodiment, it is preferred that the light shielding mask 325 is constituted by a heat conductive member such as aluminum alloy and copper alloy having a high heat conductivity. As a result, the temperature of the light shielding member in the region u5 increases to generate much difference in temperature and the average temperature gradient can be increased, and accordingly the efficiency of capturing the fine particles can be improved.

The projection display apparatus of each embodiment is capable of providing a high-quality projection image for a long time by capturing the fine particles outside the effective pixel area of the light modulation element to suppress (reduce) the adherence of the fine particles to the effective pixel area. Thus, according to each embodiment, a projection display apparatus and an image display system capable of reducing adherence of foreign substances to a light modulation element can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a method of cooling the light modulation element or the radiator by a Peltier element to increase the difference in temperature from the light shielding mask or a method of heating the light shielding mask to increase the difference in temperature from the light modulation element or the radiator may be adopted.

This application claims the benefit of Japanese Patent Application No. 2014-132653, filed on Jun. 27, 2014, which is hereby incorporated by reference wherein in its entirety.

What is claimed is:

1. A projection display apparatus comprising:
   a light shielding member provided with an opening through which light from a light source passes; and
   a light modulation element unit configured to face the light shielding member to be illuminated by the light passing through the opening of the light shielding member,
   wherein the light shielding member has a first region and a second region that is located between the first region and the opening,
   wherein the light modulation element unit has a third region facing the first region, and a fourth region facing the second region, and
   wherein a first average temperature gradient between the first region and the third region is greater than a second average temperature gradient between the second region and the fourth region.

2. The projection display apparatus according to claim 1, wherein the second region is located around the opening of the light shielding member, and
   wherein the first region is located farther away from the opening than the second region is.

3. The projection display apparatus according to claim 1, wherein the light modulation element unit includes:
   a light modulation element including a cover glass and configured to be illuminated by the light from the light source, and
   a radiator configured to release heat of the light modulation element.

4. The projection display apparatus according to claim 3, wherein the second region is located around an effective pixel region of the light modulation element,
   wherein the first region is located farther away from the effective pixel region than the second region is,
   wherein the first average temperature gradient is an average temperature gradient between the light shielding member in the first region and the cover glass of the light modulation element in the third region, and
   wherein the second average temperature gradient is an average temperature gradient between the light shielding member in the second region and the cover glass of the light modulation element in the fourth region.

5. The projection display apparatus according to claim 3, further comprising a dust-proof member attached to the radiator to cover the cover glass of the light modulation element.

6. The projection display apparatus according to claim 1, wherein the light shielding member is constituted by a member having a heat conductivity not less than 150 (W/m·K).

7. The projection display apparatus according to claim 1, wherein the first and second average temperature gradients are average temperature gradients determined when a predetermined period of time passes after the light source is turned on.

8. The projection display apparatus according to claim 1, wherein a distance between the light shielding member in the second region and the light modulation element unit in the fourth region is smaller than a distance between the light shielding member in the first region and the light modulation element unit in the third region.

9. The projection display apparatus according to claim 8, wherein the light shielding member in the second region has a shape protruded in a direction toward the light modulation element unit.

10. The projection display apparatus according to claim 8, wherein the light modulation element unit in the fourth region has a convex portion protruded in a direction toward the light shielding member.

11. The projection display apparatus according to claim 8, wherein the light shielding member in the first region has a convex portion protruded in a direction opposite to the light modulation element unit.

12. The projection display apparatus according to claim 8, wherein the light shielding member in the second region has an inclined portion formed to be closer to the light modulation element unit as approaching the opening of the light shielding member.

13. The projection display apparatus according to claim 8, wherein the light shielding member includes:
    a first light shielding member, and
    a second light shielding member which is disposed closer to the light modulation element unit than the first light shielding member is,
    wherein the second light shielding member contacts a radiator,
    wherein the second light shielding member in the first region is provided with a plurality of openings, and
    wherein a heat conductivity of the second light shielding member is higher than a heat conductivity of the first light shielding member.

14. The projection display apparatus according to claim 13,
    wherein the first light shielding member has a plurality of protrusions inserted into the plurality of openings of the second light shielding member.

15. The projection display apparatus according to claim 8,
    wherein the light shielding member in the second region has a surface facing the light modulation element unit, and
    wherein a black surface treatment is performed on the surface.

16. A projection display apparatus comprising:
    a light shielding member provided with an opening through which light from a light source passes; and
    a light modulation element unit configured to face the light shielding member to be illuminated by the light passing through the opening of the light shielding member,
    wherein the light shielding member has a first region and a second region that is located between the first region and the opening,
    wherein the light modulation element unit has a third region facing the first region, and a fourth region facing the second region, and
    wherein a distance between the light shielding member in the second region and the light modulation element unit in the fourth region is smaller than a distance between the light shielding member in the first region and the light modulation element unit in the third region.

17. An image display system comprising:
    the projection display apparatus according to claim 1, and
    an image supplying apparatus configured to supply image information to the projection display apparatus.

* * * * *